United States Patent
Kumaran

(10) Patent No.: US 9,261,615 B2
(45) Date of Patent: Feb. 16, 2016

(54) SEISMIC ANOMALY DETECTION USING DOUBLE-WINDOWED STATISTICAL ANALYSIS

(71) Applicant: Krishnan Kumaran, Raritan, NJ (US)

(72) Inventor: Krishnan Kumaran, Raritan, NJ (US)

(73) Assignee: ExxonMobil Upstream Research Company, Houston, TX (US)

(*) Notice: Subject to any disclaimer, the term of this patent is extended or adjusted under 35 U.S.C. 154(b) by 462 days.

(21) Appl. No.: 13/860,313

(22) Filed: Apr. 10, 2013

(65) Prior Publication Data

US 2013/0338927 A1 Dec. 19, 2013

Related U.S. Application Data

(60) Provisional application No. 61/660,477, filed on Jun. 15, 2012.

(51) Int. Cl.
*G01V 1/30* (2006.01)
*G01V 1/00* (2006.01)

(52) U.S. Cl.
CPC .. *G01V 1/30* (2013.01); *G01V 1/00* (2013.01); *G01V 1/301* (2013.01)

(58) Field of Classification Search
CPC combination set(s) only.
See application file for complete search history.

(56) References Cited

U.S. PATENT DOCUMENTS

| | | |
|---|---|---|
| 5,416,750 A | 5/1995 | Doyen et al. |
| 5,444,619 A | 8/1995 | Hoskins et al. |
| 5,539,704 A | 7/1996 | Doyen et al. |
| 5,586,082 A | 12/1996 | Anderson et al. |
| 5,677,893 A | 10/1997 | de Hoop et al. |
| 5,848,379 A | 12/1998 | Bishop |
| 5,852,588 A | 12/1998 | de Hoop et al. |
| 5,892,732 A * | 4/1999 | Gersztenkorn ............... 367/72 |
| 5,940,777 A | 8/1999 | Keskes |
| 6,052,650 A | 4/2000 | Assa et al. |
| 6,226,596 B1 | 5/2001 | Gao |

(Continued)

FOREIGN PATENT DOCUMENTS

| | | | |
|---|---|---|---|
| WO | WO 99/64896 | * 12/1999 | ............... G01V 1/30 |
| WO | WO 2010/056424 | 5/2010 | |
| WO | WO 2011/139416 | 11/2011 | |

OTHER PUBLICATIONS

Cho, W.H. et al. (1992), "Estimation of polarization and slowness in mixed wavfields," *Geophysics* 57(6), pp. 805-814.

(Continued)

*Primary Examiner* — Huan Tran
(74) *Attorney, Agent, or Firm* — ExxonMobil Upstream Research Company, Law Dept.

(57) ABSTRACT

Method for identifying geologic features from seismic data (11) using seismic anomaly detection by a double-windowed statistical analysis. Subtle features that may be obscured using a single window on the data are made identifiable using two moving windows of user-selected size and shape: a pattern window located within a sampling window larger than the pattern window (12). If Gaussian statistics are assumed, the statistical analysis may be performed by computing mean and covariance matrices for the data within the pattern window in its various positions within the sampling window (13). Then a specific measure of degree of anomaly for each voxel such as a residue value may be computed for each sampling window using its own mean and covariance matrix (14), and finally the resulting residue volume may be analyzed, with or without thresholding, for physical features indicative of hydrocarbon potential (15).

13 Claims, 2 Drawing Sheets

(56) References Cited

U.S. PATENT DOCUMENTS

| | | | |
|---|---|---|---|
| 6,236,942 B1 | 5/2001 | Bush | |
| 6,295,504 B1 | 9/2001 | Ye et al. | |
| 6,574,565 B1 | 6/2003 | Bush | |
| 6,618,678 B1 | 9/2003 | Van Riel | |
| 6,625,541 B1 | 9/2003 | Shenoy et al. | |
| 6,725,163 B1 | 4/2004 | Trappe et al. | |
| 6,735,526 B1 | 5/2004 | Meldahl et al. | |
| 6,754,589 B2 | 6/2004 | Bush | |
| 6,757,614 B2 | 6/2004 | Pepper et al. | |
| 6,804,609 B1 | 10/2004 | Brumbaugh | |
| 6,847,895 B2 | 1/2005 | Nivlet et al. | |
| 6,941,228 B2 | 9/2005 | Toelle | |
| 6,950,786 B1 | 9/2005 | Sonneland et al. | |
| 6,957,146 B1 | 10/2005 | Taner et al. | |
| 6,970,397 B2 | 11/2005 | Castagna et al. | |
| 6,988,038 B2 | 1/2006 | Trappe et al. | |
| 7,206,782 B1 | 4/2007 | Padgett | |
| 7,222,023 B2 | 5/2007 | Laurent et al. | |
| 7,243,029 B2 | 7/2007 | Lichman et al. | |
| 7,248,539 B2 | 7/2007 | Borgos et al. | |
| 7,266,041 B1 | 9/2007 | Padgett | |
| 7,295,930 B2 | 11/2007 | Dulac et al. | |
| 7,411,903 B2 | 8/2008 | Jang et al. | |
| 7,453,767 B1 | 11/2008 | Padgett | |
| 7,463,552 B1 | 12/2008 | Padgett | |
| 7,697,373 B1 | 4/2010 | Padgett | |
| 8,027,517 B2 | 9/2011 | Gauthier et al. | |
| 8,363,959 B2 | 1/2013 | Boiman et al. | |
| 8,380,435 B2 * | 2/2013 | Kumaran et al. | 702/2 |
| 8,385,603 B2 | 2/2013 | Beucher et al. | |
| 2008/0270033 A1 | 10/2008 | Wiley et al. | |
| 2011/0139416 A1 | 6/2011 | Bernard | |
| 2011/0272161 A1 * | 11/2011 | Kumaran et al. | 166/369 |
| 2011/0307178 A1 | 12/2011 | Hoekstra | |
| 2012/0090001 A1 | 4/2012 | Yen | |
| 2012/0197530 A1 | 8/2012 | Posamentier et al. | |
| 2012/0197531 A1 | 8/2012 | Posamentier et al. | |
| 2012/0197532 A1 | 8/2012 | Posamentier et al. | |
| 2012/0197613 A1 | 8/2012 | Vu et al. | |
| 2012/0234554 A1 * | 9/2012 | Kumaran | 166/369 |
| 2012/0257796 A1 | 10/2012 | Henderson et al. | |
| 2013/0064040 A1 * | 3/2013 | Imhof et al. | 367/73 |
| 2013/0085715 A1 * | 4/2013 | Lakshminarayan et al. | 702/179 |
| 2013/0336091 A1 * | 12/2013 | Song et al. | 367/38 |

OTHER PUBLICATIONS

Fournier, F. et al. (1995), "A statistical methodology for deriving reservoir properties from seismic data," *Geophysics* 60(5), pp. 1437-1450.

Hagen, D.C. (1982), "The application of principal components analysis to seismic data sets," *Geoexploration* 20, pp. 93-111.

Hotelling, H. et al. (1933), "Analysis of a complex of statistical variables into principal components," *Journal of Education Physchology* 24, pp. 417-441.

Key, S.C. et al. (1990), "New approach to seismic-reflection event detection and velocity determination," *Geophysics* 55(8), pp. 1057-1069.

Pearson, K. (1901), "On Lines and Planes of Closest Fit systems of Points in Space," *Philos. Magazine* 2, pp. 559-572.

Richwalski, S. et al. (2000), "Practical aspects of wavefield separation of two-component surface seismic data based on polarization and slowness estimates," *Geophysical Prospecting* 48, pp. 697-722.

Watanabe (1967), "Karhunen-Loeve Expansion and Factor Analysis," Transactions of the 4th Prague Conference, J. Kozesnik, ed., Prague, Czechoslovakia Academy of Science, pp.

Wu, J. et al. (2005), "Establishing Spatial Pattern Correlations between Water Saturation Time-Lapse and Seismic Amplitude Time-Lapse," Petroleum Society's 6th Annual Canadian Int'l. Petroleum Conf., pp. 1-9.

Scheevel, J.R. et al. (2001), "Principal Component Analysis Applied to 3D Seismic Data for Reservoir Property Estimation," SPE Reservoir Evaluation & Engineering, 64-72.

Watanabe, S. (1967), "Karhunen-Loeve Expansion and Factor Analysis Theoretical Remarks and Applications." Transactions of the Fourth Prague Conference, pp. 1-26.

\* cited by examiner

Synthetic Data with Multiple Anomalies

Residue with Single Window WPCA

Residue with Double Window WPCA

Original Data

Single Window Residue

Double-Windowed Residue

SEISMIC ANOMALY DETECTION USING DOUBLE-WINDOWED STATISTICAL ANALYSIS

CROSS-REFERENCE TO RELATED APPLICATION

This application claims the benefit of U.S. Provisional Patent Application 61/660,477, filed Jun. 15, 2012, entitled SEISMIC ANOMALY DETECTION USING DOUBLE-WINDOWED STATISTICAL ANALYSIS, the entirety of which is incorporated by reference herein.

FIELD OF THE INVENTION

The invention relates generally to the field of geophysical prospecting, and more particularly to a method for processing geophysical data. Specifically, the invention is a method for highlighting regions in one or more geological or geophysical datasets such as seismic, that represent real-world geologic features including potential hydrocarbon accumulations without the use of prior training data, and where the desired physical features may appear in the unprocessed data only in a subtle form, obscured by more prominent anomalies.

BACKGROUND OF THE INVENTION

Seismic datasets often contain complex patterns that are subtle and manifested in multiple seismic or attribute/derivative volumes and at multiple spatial scales. Over the last several decades, geologists and geophysicists have developed a range of techniques to extract many important patterns that indicate the presence of hydrocarbons. However, most of these methods involve searching for either known or loosely defined patterns with pre-specified characteristics in one data volume, or two volumes at the most. These "template-based" or "model-based" approaches often miss subtle or unexpected anomalies that do not conform to such specifications. These approaches will not be discussed further here as they have little in common with the present invention except that they address the same technical problem. It is therefore desirable to develop statistical analysis methods that are capable of automatically highlighting anomalous regions in one or more volumes of seismic data across multiple spatial scales without a priori knowledge of what they are and where they are.

PCT Patent Publication WO 2010/056424 discloses a method to perform such statistical analysis to highlight anomalies automatically in multi-volume seismic analysis using a single moving window on the data to gather statistics. See also PCT Patent Publication WO 2011/139416. Both of these patent application publications are incorporated by reference herein in all countries that allow it. However, the single-windowed approach has some limitations arising from a lack of adaptivity, which biases the results towards prominent detection of obvious and dominant anomalies with weaker or suppressed response for subtle anomalies. Accordingly, there is a need for a method that mitigates these limitations, and the present invention satisfies this need.

SUMMARY OF THE INVENTION

In one embodiment, the invention is a method for inferring presence of hydrocarbons from a seismic data volume representing a subsurface region, using local statistical distributions of seismic data values, comprising:

(a) using two moving windows of user-selected size and shape, one being a pattern window and the other a sampling window larger than the pattern window, wherein the sampling window moves to different locations in the seismic data volume to sample the seismic data volume, and at each location of the sampling window the pattern window moves about within the sampling window;

(b) for each sampling window location, computing a statistical distribution of seismic data values for all pattern windows contained within the sampling window;

(c) from the statistical distribution within a sampling window, computing an outlier probability or residue for each sampling window; and (d) interpreting the outlier probabilities or residues for the sampling windows for indications of hydrocarbon presence within the subsurface region;

wherein at least one of (a)-(d) is performed using a computer.

BRIEF DESCRIPTION OF THE DRAWINGS

The present invention and its advantages will be better understood by referring to the following detailed description and the attached drawings in which.

Figure 1:
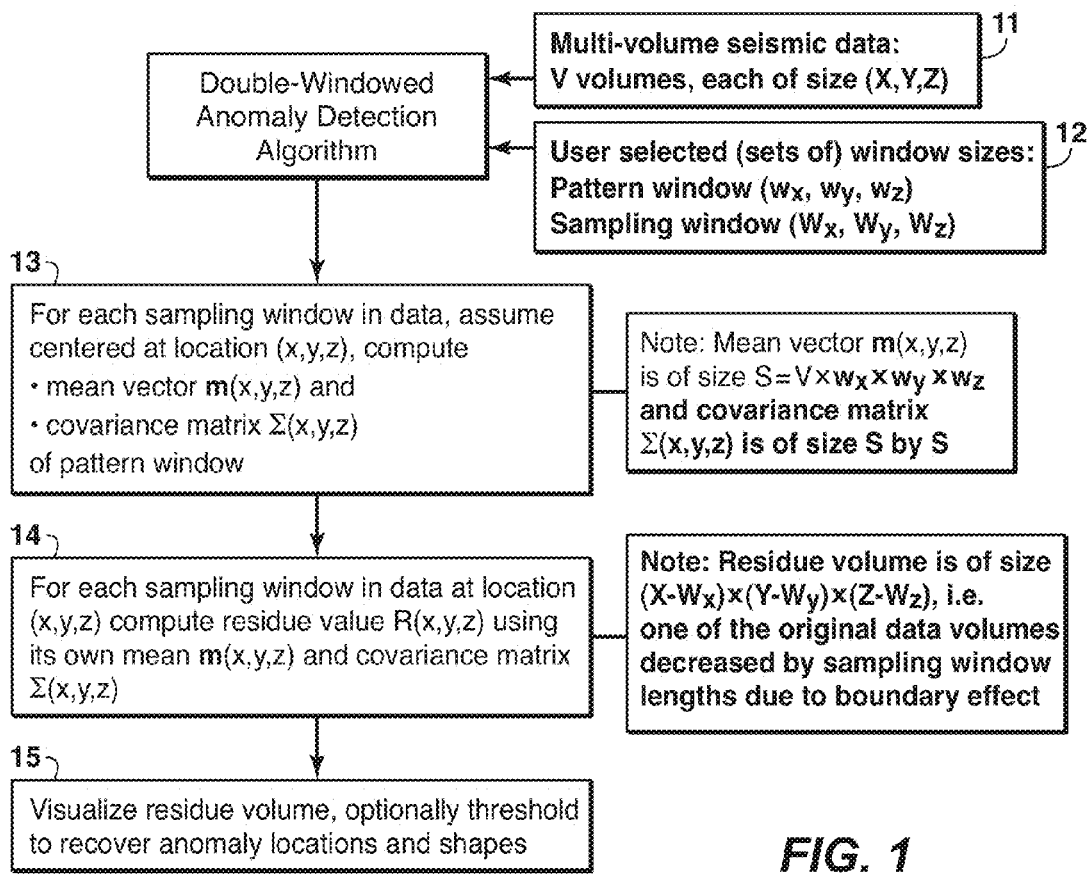
FIG. 1 is a flowchart showing basic steps in one embodiment of the present invention's double-windowed statistical analysis method for anomaly detection in multi-volume seismic data.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is a method for detecting anomalous patterns in multi-volume seismic or other geophysical data (for example, electromagnetic data) across multiple spatial scales without the use of prior training data. The inventive method may use Windowed Statistical Analysis, which involves the following basic steps in one embodiment of the invention:

1. Extracting a statistical distribution of the data within windows of user-specified size and shape. Standard statistical techniques such as Principal Component Analysis (PCA), Independent Component Analysis (ICA), Clustering Analysis may be used.
2. Extracting anomalous regions in the data by (a) computing the probability of occurrence (or equivalent metric) of each data window in the extracted distribution (b) identifying low probability data regions as possible anomalies.

A particularly convenient embodiment of the invention involves a combination of Windowed Principal Component Analysis ("WPCA"), Residual Analysis, and Clustering Analysis which will be described in detail below. However, anyone of ordinary skill in the technical field will readily appreciate how other statistical analysis techniques may be used or suitably adapted to achieve the same goals.

A useful generalization of Principal Component Analysis ("PCA") is a method known as Independent Component Analysis ("ICA"), which is preferable when the data strongly differ from the standard multi-dimensional Gaussian distribution. In this case, the present inventive method may be correspondingly generalized to use Windowed ICA ("WICA"), followed by a generalization of Residual Analysis, termed Outlier Detection. In one embodiment, the present invention uses PCA on moving windows, followed by computation of inner products and data residuals from the Principal Components ("PCs"), which is believed to be advantageously applicable not only in seismic applications, but across the broader field of multi-dimensional data processing. This includes the fields of image, speech, and signal processing.

Principal Component Analysis ("PCA") is a well-known classical technique for data analysis, first proposed by Pearson ("On Lines and Planes of Closest Fit to Systems of Points in Space," *Philos. Magazine* v. 2, pp. 559-572 (1901)) and further developed by Hotelling ("Analysis of a Complex of Statistical Variables Into Principal Components," *Journal of Education Psychology* v. 24, pp. 417-441 (1933)). What is believed to be the first known application of principal component analysis to seismic data occurred in the form of the Karhunen-Loeve transform, named after Kari Karhunen and Michel Loeve (Watanabe, "Karhunen-Loeve Expansion and Factor Analysis," *Transactions of the Fourth Prague Conference*, J. Kozesnik, ed., Prague, Czechoslovakia Academy of Science (1967)). This method uses PCA to describe the information content in a set of seismic traces, with the form of the input dataset being entire seismic traces, not multi-dimensional windows of variable size. Watanabe's primary application was to decompose entire seismic traces, and use the first several principal component traces to reconstruct the most coherent energy, thereby filtering out non-geologic noise.

PCA is most commonly used in seismic analysis to reduce the number of measurement characteristics to a statistically independent set of attributes (see, e.g., Fournier & Derain, "A Statistical Methodology for Deriving Reservoir Properties from Seismic Data," *Geophysics* 60, 1437-1450 (1995); and Hagen, "The Application of Principal Components Analysis to Seismic Data Sets," *Geoexploration* 20, 93-111 (1982)). The seismic interpretation process often generates numerous derivative products from the original data. Since these attributes correlate to varying degrees, PCA has been an elegant way to reduce the number of attributes, while retaining a large amount of information.

PCT International Publication WO 2011/139416 (Nov. 10, 2011) is a recent publication describing a moving window-based statistical outlier detection technique devoted to finding geologic features of interest on a scoping and reconnaissance basis in geological and geophysical data. Moreover, such techniques have been applied to specific subsets or domains of seismic data for specialized signal processing or reservoir characterization applications. Key and Smithson ("New Approach to Seismic Reflection Event Detection and Velocity Determination," *Geophysics* 55, 1057-1069 (1990)) apply PCA on 2D moving windows in pre-stack seismic data, and ratio the resultant eigenvalues as a measure of signal coherency. No use is made of the principal components themselves to detect features in the prestack seismic data. Sheevel and Payrazyan ("Principal Component Analysis Applied to 3D Seismic Data for Reservoir Property Estimation," *Society of Petroleum Engineers Annual Conference and Exhibition* (1999)) calculate trace-based principal components using small, 1D moving vertical windows, and input those PCs that look most geologic into a classification algorithm that predicts reservoir properties away from well calibration. Once again, this 1D, single dataset approach, makes no attempt to automatically identify anomalies or outliers in the data. Cho and Spencer ("Estimation of Polarization and Slowness in Mixed Wavefields," *Geophysics* 57, 805-814 (1992)) and Richwalski et al. ("Practical Aspects of Wavefield Separation of Two-Component Surface Seismic Data Based on Polarization and Slowness Estimates," *Geophysical Prospecting* 48, 697-722 (2000)) use 2D windowed PCA in the frequency domain to model the propagation of a pre-defined number P- & S-waves.

The goal of Wu et al. ("Establishing Spatial Pattern Correlations Between Water Saturation Time-Lapse and Seismic Amplitude Time-Lapse," *Petroleum Society's 6th Annual Canadian International Petroleum Conference* (56th *Annual Technical Meeting*) (2005)) is to optimally correlate single seismic or time-lapse seismic volumes to flow simulation data in a reservoir model to estimate actual saturation time-lapse values of spatial patterns. Their approach is to perform point-to-point comparisons, not on the original data volumes, but on the projection of these data onto the first principal eigenvector from PCA analysis. Thus, their objective is correlation of seismic data to a known model instead of identification of anomalous patterns in the seismic data.

U.S. Pat. No. 5,848,379 to Bishop ("Method for Characterizing Subsurface Petrophysical Properties Using Linear Shape Attributes," (1998)) discloses a method to predict subsurface rock properties and classify seismic data for facies or texture analysis, not to identify geologic features of interest on a scoping and reconnaissance basis which is the technical problem addressed by the present invention. Bishop performs statistical analysis using PCA to decompose seismic traces into a linear combination of orthogonal waveform bases called Linear Shapes within a pre-specified time or depth interval. A Linear Shape Attribute (LSA) is defined as the subset of weights (or eigenvalues) used to reconstruct a particular trace shape. Also, Bishop does not disclose overlapping windows, simultaneously analyzing multiple data volumes, or use of a statistical distribution to detect anomalous data regions. Both of these features are used in at least some embodiments of the present inventive method.

Other approaches for statistically analyzing geological and geophysical data have used methods such as Artificial Neural Networks, Genetic Algorithms, and multipoint statistics, but not with the goal of automatic detection of anomalous patterns. In addition, these methods have generally had limited success, since their inner workings are often obscure, and they often require, and are highly dependent on, large amounts of training data.

As stated previously, PCA and ICA are methods that are commonly used to separate high-dimensional (i.e., multivariable or -attribute) signals into statistically uncorrelated (i.e., independent) components. Windowed PCA and ICA may be used in the present invention to apply component analysis to a dataset that is derived from the original data by representing each point in the original data as a collection of points in its neighborhood (i.e., window). To illustrate this concept for a single window as in PCT International Publication No. 2011/139416, the implementation of WPCA on a single, 3-dimensional, data volume using a fixed window size is outlined next. The same procedure or its ICA equivalent could be applied to 2D data, or simultaneously to multiple 2D or 3D data volumes. Consider a 3D seismic volume of size $N_x \times N_y \times N_z$, and select a window shape (e.g., ellipsoid or cuboid) and size (e.g., radius r, $n_x \times n_y \times n_z$)

Each voxel in the 3D seismic volume, $I_{i,j,k}$, may be represented as an $n_x \times n_y \times n_z$ dimensional vector $\vec{I}_{i,j,k}$, that contains voxel values within each voxel's windowed neighborhood. Next, compute the mean and covariance matrix of all n-dimensional vectors $(n=n_x \times n_y \times n_z)\{\vec{I}_{i,j,k}\}(N=(N_x-n_x) \times (N_y-n_y) \times (N_z-n_z)$ of them) as follows:

$$\vec{I} = \frac{1}{N}\sum_{i,j,k}\vec{I}_{i,j,k}, \quad W = \frac{1}{N}\sum_{i,j,k}\left(\vec{I}_{i,j,k} - \vec{I}\right)\left(\vec{I}_{i,j,k} - \vec{I}\right)^T$$

Then, compute the correlation matrix as $$\hat{W}(t,k) = \frac{W(t,k)}{\sqrt{W(t,t)}\sqrt{W(k,k)}}$$

where t and k are two indices of the vector I and thus represent two different sets of spatial coordinates in three dimensions. Then, calculate the eigenvalues (Principal Values) $\{\lambda_1 > \lambda_2 > \ldots \lambda_n\}$ and eigenvectors (Principal Components) $\{v_1, v_2, \ldots, v_n\}$ of $\hat{W}$. Alternatively, eigenvalues of the covariance matrix may be computed; they will differ from the eigenvalues of the correlation matrix only by a scaling factor. These eigenvectors will be $n_x \times n_y \times n_z$ in size, and when reshaped from their vector form back to window form, represent the various (independent) spatial patterns in the data, ordered from most common to least common. The corresponding eigenvalues represent how much of the original data (i.e., amount of variance) that each eigenvector accounts for.

One or more of the following partial volumes of seismic or attribute data may then be generated, which are then examined for anomalies that may not have been apparent from the original data volume:

(1) Projection: The portion of the original data that can be recreated using each Principal Component or groups of Principal Components (chosen, for example, from clustering analysis). This is achieved by taking the inner-product of the mean-centered and normalized seismic volume on each Principal Component or groups of Principal Components. Thus, the projection of vector A onto vector B means proj(A)= $(A \cdot B)/|B|^2$ and is a vector in the direction of B.

(2) Residual: The remaining signal in the original volume that is not captured by the first k−1 (i.e., most common) Principal Components. In a preferred embodiment of the invention, this is achieved by projecting the mean-centered and normalized seismic volume onto the sub-space spanned by $\{v_k, v_{k+1}, \ldots, v_n\}$ so that $$\sum_{i=1}^{k-1}\lambda_i > R \cdot \sum_{i=1}^{n}\lambda_i,$$

where R is a user-defined threshold between 0 and 1. Alternatively, one could add projections bottom-up, but this would be computationally more burdensome in most cases.

(3) Outlier: The residual analysis of item (2) is the way the "degree of anomaly" of each voxel is determined in one embodiment of the invention. The attribute data volumes of (1) and (2) are not needed in an alternative way of computing the "degree of anomaly" of each voxel, which will be denoted as R' (since it is related to, but not the same as, the residue R defined above), and is given by the following formula:

$$R'_{i,j,k} = (I_{i,j,k} - \vec{I})^T \hat{W}^{-1}(I_{i,j,k} - \vec{I}).$$

Using this measure of degree of anomaly, a partial data volume may be developed. This measure also picks "outliers" that lie in the space spanned by the first few eigenvectors, but can be more computationally intensive than the above two steps in some cases. However, it may be noted that in this the step above of calculating the eigenvalues and eigenvectors can be skipped, or simply replaced by a Cholesky decomposition of the correlation matrix, which enables faster evaluation of R'.

There are variants of the above basic approach that employ different data normalization schemes. The method can be extended to an arbitrary number of seismic volumes. The adjustable parameters that the user can experiment with are (1) window shape, (2) window size, and (3) threshold, R, of residual projection.

Generalizations and Efficiencies in the Construction of Canonical Patterns

The following sections describe improvements to the windowed principal component analysis that enable more convenient applicability through reduced computation, and better use of results through interpretation of Principal or Independent Components and their selective retention or removal.

Computational Efficiency: The straight-forward method of computing the covariance matrix above is computationally burdensome for large datasets, both in memory and processor requirements. An alternative method is therefore disclosed herein that exploits the fact that the individual vectors of the PCA are windows moving across the data. Consider, for example, a 1-D dataset with values $\{I_1, I_2, \ldots, I_n\}$. To evaluate the covariance matrix of windows of size K<N, the mean and second moment of the entries can be computed as follows:

$$E(X_i) = \overline{X}_i = \frac{1}{N-K}\sum_{k=i}^{N-K+i} I_k \text{ for } 1 \leq i \leq K$$

$$E(X_i X_j) = \frac{1}{N-K}\sum_{k=i}^{N-K+i} I_k I_{k+j-i} \text{ for } 1 \leq i \leq j \leq K$$

It may be noted that this method only involves taking averages and inner products of sub-vectors of the data (sub-matrices in higher dimensions), and hence avoids storing and manipulating numerous smaller-sized windows derived from the original data. This modification of the computational method thus allows object-oriented software with efficient array indexing (such as Matlab and the use of Summed-Area Tables, a data structure described by Crow in "Summed-Area Tables for Texture Mapping," *Computer Graphics* 18, 207 (1984)) to compute the covariance matrices with minimal storage and computational effort.

Nested Double Window

U.S. Provisional Patent Application No. 61/453,809, which is incorporated herein by reference in all countries that allow it, discloses a method, suitable for automation, for texture segmentation using double-windowed clustering analysis, which adds a "sampling window", within which the first "pattern window" moves to gather local statistics. Used in conjunction with an outlier identification method, for example PCA (Principal Component Analysis) in the case of Gaussian distributions (see WO 2010/056424), this double-windowed approach can detect both obvious and subtle anomalies in multi-dimensional, multi-volume seismic data in a more adaptive manner compared to the single-windowed version.

Figure 2:
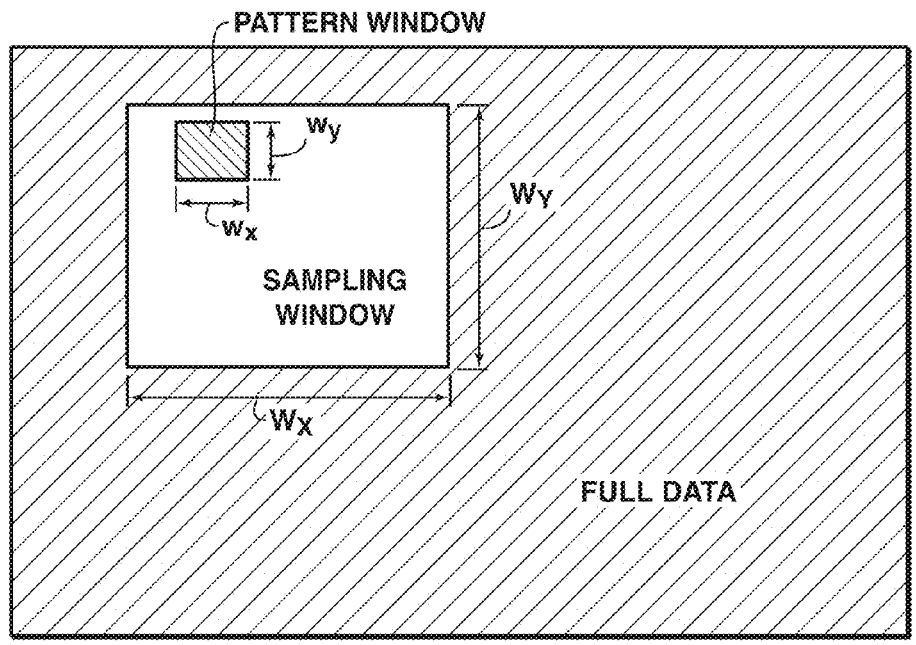
FIG. 2 is a schematic depiction of the two windows of the present invention located within the full data for a 2-D image.

The present invention applies the double-windowed approach to outlier detection in residual data volumes. In at least some of its embodiments, the present inventive method is described in the flowchart of FIG. 1, and uses two nested windows (12) on the data (11) as illustrated in FIG. 2. The distribution of the pattern window within the sampling window is computed by shifting the positions of the pattern window within the sampling window. For example, assuming Gaussian distributions, the mean and covariance (13) are computed as x=vector of values in pattern window (e.g. 9-d for a 3×3 window on 2-d image)

$$\text{Mean}(\text{Sampling Window } S_i) = \frac{\sum_{j \in S_i} x_j}{|S_i|} = \text{Average of all pattern vectors in sampling window}$$

$$\text{Covariance}(S_i) = \frac{\sum_{j \in S_i} x_j x_j^T}{|S_i|} - \text{Mean}(S_i), \text{Mean}(S_i)^T$$

The outlier likelihood is then computed as the Residue (14):

$$\text{Residue}(S_i) = (x_c - \text{Mean}((S_i))^T \cdot [\text{Covariance}((S_i)]^{-1} \cdot (x_c - \text{Mean}((S_i))$$

where $x_c$ is the pattern window at the center of the sampling window $S_i$. In the single window approach described previously above, the mean and covariance are computed only once over the whole data by moving the window within the data.

At step 15, a data volume of residue values may be computed and assembled, with a residue value for each voxel in the original seismic data volume. The residue value for a given voxel is determined by the sampling window centered on that voxel. Then, the residue volume may be displayed and visualized to interpret for features indicative of hydrocarbons. For voxels near the data volume boundary, for which the sampling window would not entirely fit within the data volume, one may use the distribution from the closest sampling window that entirely fits within the data volume. The residue volume may be thresholded, using a user-selected threshold, to better highlight the anomaly locations.

The above-described double windowed implementation offers several key advantages over single-windowed approaches:
(1) Residue, and hence notion of anomaly, become "local"—obvious anomalies are less likely to mask out subtle anomalies;
(2) Anomalies have less data sensitivity—local anomaly remains so regardless of structure of data far away from it;
(3) Fully parallelizable, unlike single-windowed approaches.

EXAMPLES

Figure 3A:
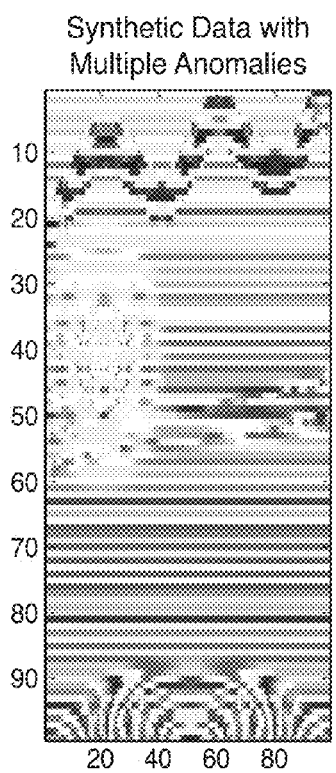
FIGS. 3A-3C show test results of applying single-windowed statistical analysis (FIG. 3B) and the double-windowed statistical analysis of the present invention (FIG. 3C) to the synthetic data of FIG. 3A.
Figure 3B:
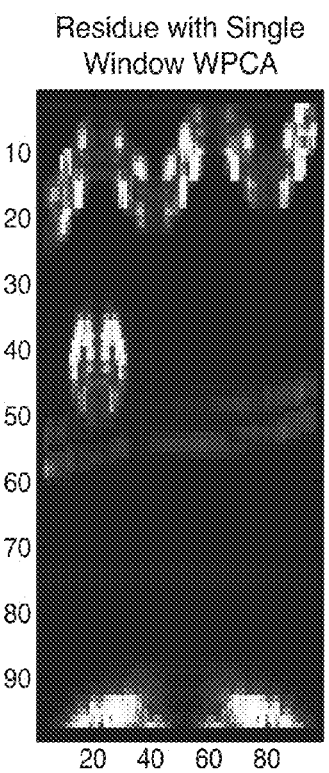
Figure 3C:
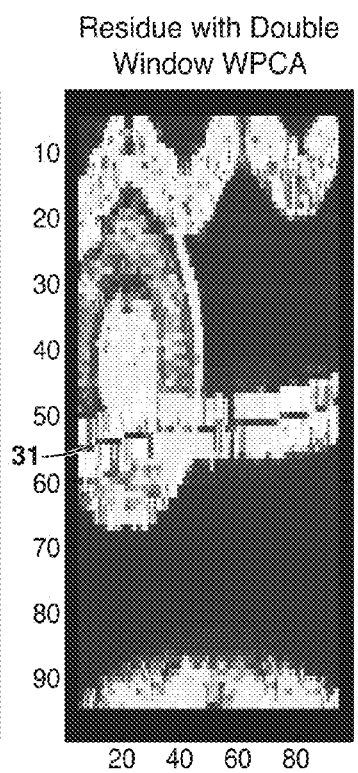

The difference in performance between the single- and double-windowed approaches is shown in FIGS. 3A-3C and 4A-4C, which are black-and-white reproductions of colored data displays due to patent law restrictions that do not allow the use of color. In all of these figures, the vertical axis represents depth, and the horizontal axis represents horizontal location. FIG. 3A shows synthetic data with many anomalies generated for this example. FIG. 3B shows the results of applying Single-Windowed Statistical Analysis to the synthetic data. FIG. 3C shows the results of applying the Double-Windowed Enhancement of the present invention to the synthetic data. Note the double-windowed version exposes local anomalies much more clearly, such as the channel 31 running through the center, which is obscured by other prominent anomalies in the single-windowed version.

Figure 4A:
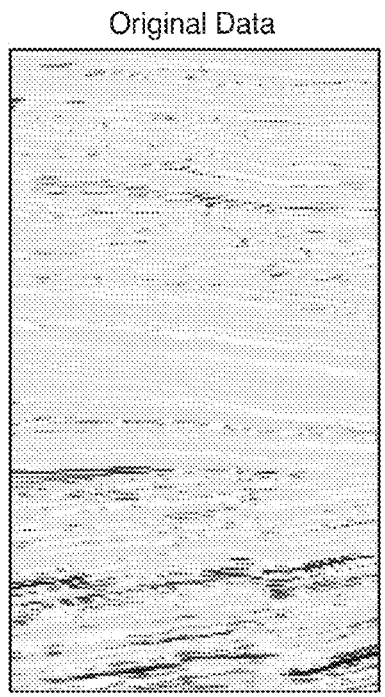
FIGS. 4A-4C show a similar comparison for real seismic data (FIG. 4A); wherein FIGS. 3A-3C and 4A-4C provide informative illustrations of how the present invention works to reveal subtle features that are obscured by more conventional statistical analysis.
Figure 4B:
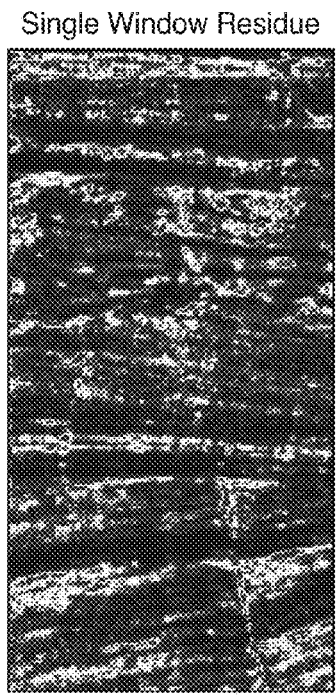
Figure 4C:
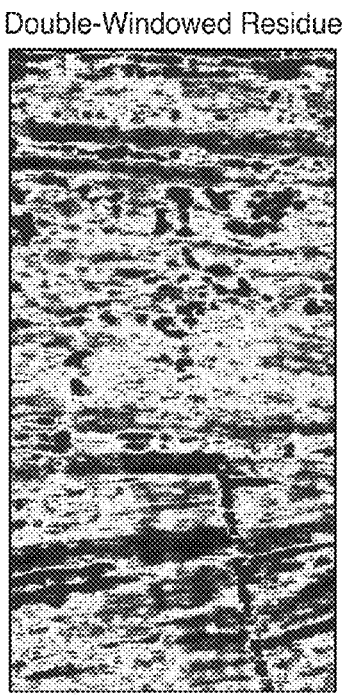

FIGS. 4A-4C show the same comparison for real seismic data (FIG. 4A). Note that the double-windowed result (FIG. 4C) exposes many more local anomalies in the data compared to the single-windowed result (FIG. 4B).

The significant enhancement of a number of subtler seismic features in FIGS. 3C and 4C illustrates the need for and use of the invention.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for inferring presence of hydrocarbons from a seismic data volume representing a subsurface region, using local statistical distributions of seismic data values, comprising:
   (a) using two moving windows of user-selected size and shape, one being a pattern window and the other a sampling window larger than the pattern window, wherein the sampling window moves to different locations in the seismic data volume to sample the seismic data volume, and at each location of the sampling window the pattern window moves about within the sampling window;
   (b) for each sampling window location, computing a statistical distribution of seismic data values for all pattern windows contained within the sampling window;
   (c) from the statistical distribution within a sampling window, computing an outlier probability or residue for each sampling window; and
   (d) generating, with a computer, a subsurface image that identifies geologic features, including hydrocarbon accumulations, within the seismic data volume using the outlier probabilities or residues for the sampling windows.

2. The method of claim 1, wherein the outlier probability or residue computed for a sampling window represents the pattern window located at the sampling windows center.

3. The method of claim 1, wherein the statistical distribution is assumed to be Gaussian, and the outlier probability or residue for each sampling window is computed from a mean and a covariance of the Gaussian distribution.

4. The method of claim 3, wherein the residue for sampling window $S_i$ is computed from a formula that may be written as $$\text{Residue}(S_i) = (x_c - \text{Mean}((S_i))^T \cdot [\text{Covariance}((S_i)]^{-1} \cdot (x_c - \text{Mean}((S_i))$$

where $x_c$ is a vector of data values from the pattern window when located at the center of the sampling window and T means matrix transpose.

5. The method of claim 1, wherein the seismic data volume and the pattern and sampling windows are two-dimensional, or wherein the seismic data volume and the pattern and sampling windows are three-dimensional.

6. The method of claim 1, further comprising thresholding the outlier probabilities or residues before the interpreting, using a user-selected threshold.

7. The method of claim 1, wherein the statistical distribution of seismic data values is computed using one of a group of statistical analysis techniques consisting of:
   (i) forming for each pattern window a data window vector whose components consist of voxel values from within that pattern window, then computing a mean matrix and covariance matrices of all data window vectors;
   (ii) Independent Component Analysis;
   (iii) using a clustering method to cluster the seismic data; and
   (iv) another statistical analysis method.

8. The method of claim 7, wherein statistical analysis is performed using (i), and further comprising using Principal Component Analysis.

9. The method of claim 8, wherein eigenvalues and eigenvectors of the covariance matrices are computed, said eigenvectors being a set of principal components of a corresponding original data volume;
   and wherein (c) and (d) comprise projecting an original data volume on a selected subset of the eigenvectors to generate a partial projected data volume, said subset of eigenvectors being selected based on their corresponding eigenvalues, and determining a residual data volume, being the portion of the original data volume not captured in the projected data volume; then identifying anomalous features in the residual data volume, and using them to predict hydrocarbon presence in the subsurface region.

10. The method of claim 9, wherein the selected subset is selected based on internal similarity of patterns as measured by texture, chaos or other data or geometric attributes.

11. The method of claim 9, wherein the selected subset of the eigenvectors is determined by summing eigenvalues ordered from largest to smallest until the sum of the largest N eigenvalues divided by the sum of all eigenvalues exceeds a pre-selected value of R where $0<R<1$, then selecting the N eigenvectors associated with the N largest eigenvalues.

12. The method of claim 8, wherein the mean matrix and covariance matrices for the selected window size and shape are computed using complementary windows, where a complementary window corresponding to each location in the pattern window represents a set of data values that appear at that location as the pattern window is moved through the sampling window.

13. The method of claim 1, wherein each of the two moving windows is N-dimensional and the seismic data volume is M dimensional, where M and N are integers such that $1 \leq N \leq M$.

* * * * *